US012766543B2

(12) United States Patent
Lee et al.

(10) Patent No.: US 12,766,543 B2
(45) Date of Patent: Oct. 20, 2026

(54) SLOT DIE COATER

(71) Applicant: LG Energy Solution, Ltd., Seoul (KR)

(72) Inventors: Taek-Soo Lee, Daejeon (KR); Shin-Wook Jeon, Daejeon (KR); Jin-Ho Cho, Daejeon (KR); Sang-Hoon Choy, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 716 days.

(21) Appl. No.: 17/918,261

(22) PCT Filed: Oct. 27, 2021

(86) PCT No.: PCT/KR2021/015260
§ 371 (c)(1),
(2) Date: Oct. 11, 2022

(87) PCT Pub. No.: WO2022/092826
PCT Pub. Date: May 5, 2022

(65) Prior Publication Data

US 2023/0140800 A1 May 4, 2023

(30) Foreign Application Priority Data

Oct. 28, 2020 (KR) ........................ 10-2020-0141477

(51) Int. Cl.
*B05C 5/02* (2006.01)
*H01M 4/04* (2006.01)

(52) U.S. Cl.
CPC ......... *B05C 5/0262* (2013.01); *H01M 4/0404* (2013.01)

(58) Field of Classification Search
None
See application file for complete search history.

(56) References Cited

U.S. PATENT DOCUMENTS 5,733,608 A * 3/1998 Kessel .................. G11B 5/842 427/547
5,853,482 A 12/1998 Gartmann et al.
(Continued)

FOREIGN PATENT DOCUMENTS

DE 19530516 A1 2/1997
JP 2010051845 A 3/2010
(Continued)

OTHER PUBLICATIONS

Extended European Search Report including Written Opinion for Application No. 21886820.6 dated Jan. 5, 2024, pp. 1-9.
(Continued)

*Primary Examiner* — Jethro M. Pence
(74) *Attorney, Agent, or Firm* — Lerner David LLP

(57) ABSTRACT

Provided is a slot die coater capable of uniformly forming a coating boundary formed in a machine direction (MD). The slot die coater includes at least two die blocks; a shim plate provided between the two die blocks to form a slot; and a manifold provided in the die block and configured to accommodate a coating solution, wherein the coating solution is discharged and applied to a substrate through a discharge port communicatively connected with the slot an end of the shim plate is moved backward relative to a die lip which is a front end of the die block so as to be offset relative to the die lip.

9 Claims, 10 Drawing Sheets

(56) References Cited

U.S. PATENT DOCUMENTS

| | | | | |
|---|---|---|---|---|
| 6,423,140 | B1 * | 7/2002 | Liu | B29C 48/305 425/133.5 |
| 8,074,902 | B2 | 12/2011 | Burmester et al. | |
| 8,752,501 | B2 * | 6/2014 | Joos | B29C 48/313 118/410 |
| 9,687,872 | B2 | 6/2017 | Joos | |
| 9,962,727 | B2 * | 5/2018 | Kim | B05C 5/0254 |
| 10,675,654 | B2 * | 6/2020 | Kuenne | B29C 48/313 |
| 11,127,936 | B2 * | 9/2021 | Kim | B05C 5/0266 |
| 11,642,692 | B2 * | 5/2023 | Horinouchi | H01M 10/058 29/623.5 |
| 11,666,936 | B2 * | 6/2023 | Parsekian | B05D 1/26 118/313 |
| 11,764,345 | B2 * | 9/2023 | Kim | B05C 5/0266 118/400 |
| 11,779,953 | B2 * | 10/2023 | Ahn | B29C 48/305 29/623.5 |
| 11,850,627 | B2 * | 12/2023 | Horinouchi | B05C 5/027 |
| 12,280,394 | B2 * | 4/2025 | Horinouchi | B05D 1/34 |
| 2006/0060135 | A1 * | 3/2006 | Rankin, Jr. | B05C 5/025 118/412 |
| 2014/0242283 | A1 * | 8/2014 | Joos | B29C 48/31 222/565 |
| 2018/0250701 | A1 * | 9/2018 | Kuenne | B29C 48/302 |
| 2019/0351446 | A1 | 11/2019 | Lee et al. | |
| 2022/0288623 | A1 * | 9/2022 | Tashiro | H01M 4/0404 |
| 2023/0256465 | A1 * | 8/2023 | Parsekian | B05D 1/26 118/313 |
| 2024/0390933 | A1 * | 11/2024 | Lin | B05C 9/06 |

FOREIGN PATENT DOCUMENTS

| | | | |
|---|---|---|---|
| JP | 2014229479 | A | 12/2014 |
| JP | 2017131806 | A | 8/2017 |
| JP | 2020131083 | A | 8/2020 |
| JP | 2020138148 | A | 9/2020 |
| KR | 20190019827 | A | 2/2019 |
| KR | 20190096114 | A | 8/2019 |
| KR | 102056479 | B1 | 12/2019 |
| KR | 20200114417 | A | 10/2020 |
| WO | 0050215 | A1 | 8/2000 |
| WO | 2019081560 | A1 | 5/2019 |

OTHER PUBLICATIONS

International Search Report for Application No. PCT/KR2021/015260 mailed Feb. 18, 2022, pp. 1-3.

* cited by examiner

SLOT DIE COATER

CROSS-REFERENCE TO RELATED APPLICATIONS

This application is a national phase entry under 35 U.S.C. § 371 of International Application No. PCT/KR2021/015260, filed on Oct. 27, 2021, which claims priority from Korean Patent Application No. 10-2020-0141477, filed on Oct. 28, 2020, the disclosures of which are incorporated herein by reference.

TECHNICAL FIELD

The present disclosure relates to a slot die coater, and more particularly to a slot die coater capable of uniformly forming a coating boundary formed in a machine direction (MD).

BACKGROUND ART

As technology development and demand for mobile devices increase, the demand for secondary batteries as an energy source is rapidly increasing, and such secondary batteries essentially include an electrode assembly which is a power generation element. The electrode assembly has a form in which a positive electrode, a separator, and a negative electrode are stacked at least once, and the positive electrode and the negative electrode are prepared by applying and drying a positive electrode active material slurry and a negative electrode active material slurry on a current collector made of aluminum foil and copper foil, respectively. In order to equalize charging/discharging features of secondary batteries, the positive electrode active material slurry and the negative electrode active material slurry should be uniformly coated on the current collector, and a slot die coater is conventionally used.

FIG. 1 shows an example of a coating method using a conventional slot die coater. FIG. 2 is a cross-sectional view of the slot die coater taken along II-II' of FIG. 1 along a machine direction (MD) (a traveling direction of a current collector).

Referring to FIGS. 1 and 2, in an electrode manufacturing method using a slot die coater 30, an electrode active material slurry discharged from the slot die coater 30 is applied on an current collector 20 transferred by a coating roll 10. The electrode active material slurry discharged from the slot die coater 30 is widely applied on one surface of the current collector 20 to form an electrode active material layer. The slot die coater 30 includes two die blocks 32 and 34 and forms a slot 36 between the two die blocks 32 and 34. The electrode active material slurry supplied from a feed portion (not shown) is accommodated in a manifold 38, and discharged through a discharge port 40 communicatively connected to the slot 36, thereby forming the electrode active material layer. Reference numerals 42 and 44 denote die lips which are front ends of the die blocks 32 and 34, respectively.

A coating width of the electrode active material layer coated on the current collector 20 is determined according to a width of the slot 36. When it is necessary to change the coating width, various coating widths may be implemented by changing a shim plate 50 that determines an inner space of the manifold 38 and the width of the slot 36. In this regard, FIGS. 3A to 3C schematically show examples of adjusting the coating width by varying the size and shape of the shim plate 50 inserted between the die blocks 32 and 34.

Referring to FIG. 3A, the shim plate 50 includes an open portion **50*a* by cutting one region thereof and is interposed in the remaining parts except for one side of an edge region of an opposite surface of each of the die blocks 32 and 34. A width of the open portion 50*a* of the shim plate 50 is designed such that an electrode active material layer 60 having a coating width a is formed on the current collector 20, and uncoated portions 62 are formed on both sides of the electrode active material layer 60**.

Referring to FIG. 3B, in order to form the electrode active material layer 60 having a coating width b smaller than a on the current collector 20, the width of the open portion **50*a* of the shim plate 50** is designed as b.

If necessary, the electrode active material layer 60 having a stripe pattern shape may be formed on the current collector 20. In such a case, the shim plate 50 as shown in FIG. 3C is used. Referring to FIG. 3C, a region of the shim plate 50 is intermittently cut so that the shim plate 50 includes a plurality of open portions **50*a*, and the width of the open portion 50*a* is c smaller than a or b. When such a shim plate 50 is used, the electrode active material layer 60 having the coating width c is formed on the current collector 20 in a plurality of stripe pattern shapes as many as the number of the open portions 50*a*, and the uncoated portions 62 are formed on both sides of the electrode active material layer 60**.

It should be noted that, in FIGS. 3A to 3C, a die lip 42 and the end of the shim plate 50 are aligned. For various reasons, when a coating gap, that is, a distance between the discharge port 40 of the slot die coater 30 and the current collector 20 (or a distance between the die lips 42 and 44 and the current collector 20) is small, in particular, when the coating gap is smaller than a coating thickness, a large pressure is applied to the discharged electrode active material slurry due to the small coating gap. For this reason, the following problems frequently occur when the electrode active material layer 60 having the stripe pattern shape as shown in FIG. 3C is formed.

FIG. 4 is a diagram showing a problem when a conventional shim plate is used. Referring to FIG. 4, as a result of applying a large pressure to a discharged electrode active material slurry, a defect caused by intermittently scattering the electrode active material slurry to a region outside a boundary, rather than stably forming the boundary between the electrode active material layer 60 and the uncoated portion 62, is illustrated. As the electrode active material slurry scatters and is coated on the uncoated portion 62, contamination of a boundary portion occurs, or non-uniformity of a boundary such as a wave pattern occurs on the boundary. A coating boundary formed in an MD needs to be uniformly formed in order to avoid a slitting defect when slitting along the uncoated portion 62 later to form an electrode with each electrode active material layer 60, and to prevent possible occurrence of an electrode disconnection after a secondary battery is manufactured due to the contamination remaining in the uncoated portion 62.

DISCLOSURE

Technical Problem

The present disclosure is designed to solve the problems of the related art, and therefore the present disclosure is directed to providing a slot die coater capable of uniformly forming a coating boundary formed in a machine direction (MD).

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a slot die coater including at least two die blocks; a shim plate provided between the two die blocks to form a slot; and a manifold provided in the die block and configured to accommodate a coating solution, wherein the coating solution is discharged and applied to a substrate through a discharge port communicatively connected with the slot, and wherein an end of the shim plate is moved backward relative to a die lip which is a front end of the die block such that the end of the shim plate is offset with respect to the die lip which is a front end of the die block.

A size of the offset may be 50 μm to 2000 μm.

The shim plate may include an open portion by cutting one region thereof so that a coating width of a coating layer applied on the substrate is determined.

The shim plate may include a plurality of open portions by intermittently cutting one region thereof so that a coating width of a coating layer applied on the substrate is determined, and the coating layer of a stripe pattern shape may be formed on the substrate.

In another aspect of the present disclosure, there is provided a dual slot die coater including a lower die block; an intermediate die block disposed on an upper portion of the lower die block to form a lower slot therebetween; an upper die block disposed on an upper portion of the intermediate die block to form an upper slot therebetween; a lower shim plate configured to define the lower slot; and an upper shim plate configured to define the upper slot, wherein the lower die block, the intermediate die block, and the upper die block respectively comprise a lower die lip, an intermediate die lip and an upper die lip forming front ends thereof, a lower discharge port communicatively connected with the lower slot is formed between the lower die lip and the intermediate die lip, and an upper discharge port communicatively connected with the upper slot is formed between the intermediate die lip and the upper die lip, the dual slot die coater is configured to discharge and apply an electrode active material slurry to a surface of a continuously traveling substrate through at least one of the lower slot and the upper slot and form an electrode active material layer, and ends of the lower shim plate and the upper shim plate are moved backward relative to the lower die lip, the intermediate die lip and the upper die lip so as to be offset relative to the lower die lip, the intermediate die lip and the upper die lip.

Each of the lower shim plate and the upper shim plate may include an open portion by cutting one region thereof so that a coating width of an electrode active material layer formed on the substrate is determined.

Each of the lower shim plate and the upper shim plate may include a plurality of open portions by intermittently cutting one region thereof so that a coating width of an electrode active material layer formed on the substrate is determined, and the electrode active material layer of a stripe pattern shape is formed on the substrate.

The lower shim plate and the upper shim plate may be aligned with each other in an up and down direction.

The lower die block may include a first manifold accommodating a first electrode active material slurry and communicatively connected with the lower slot and the intermediate die block may include a second manifold accommodating a second electrode active material slurry and communicatively connected with the upper slot.

The lower shim plate is interposed between the lower die block and the intermediate die block to adjust a width of the lower slot, and the upper shim plate is interposed between the intermediate die block and the upper die block to adjust a width of the upper slot.

An offset size A of the upper shim plate and an offset size B of the lower shim plate may be the same.

An offset size A of the upper shim plate may be different from an offset size B of the lower shim plate.

The dual slot die coater may be configured to simultaneously discharge two types of electrode active material slurries through the upper slot and the lower slot to form an electrode active material layer of a double layer on the substrate, and when a coating gap G to a coating solution thickness D of the electrode active material slurries formed on the substrate is equal to or greater than 1.06, with respect to an offset size A of the upper shim plate and an offset size B of the lower shim plate, A:B may be set to 7:1 to 1:7.

Advantageous Effects

According to an aspect of the present disclosure, the end of the shim plate is moved backward relative to the die lip so as to be offset relative to the die lip. According to this configuration, even if a large pressure is applied to the coating solution discharged from the discharge port when the coating gap is small, after the coating solution is sufficiently expanded from the end of the shim plate in an offset section, that is, after a certain part of the discharge pressure is relieved, the coating solution may leave the die lip and reach the substrate so that the coating solution does not scatter. Accordingly, the boundary may be stably formed between the coating portion and the uncoated portion.

According to another aspect of the present disclosure, the dual slot die coater optimized for application of the electrode active material slurry is provided. The end of the shim plate is also moved backward relative to the die lip so as to be offset relative to the die lip. According to this configuration, even if a large pressure is applied to the electrode active material slurry when the coating gap is small, the coating solution does not scatter. Accordingly, the boundary may be stably formed between the coating portion and the uncoated portion. In particular, when the electrode active material layer having a stripe pattern shape is formed, it is possible to stably form the electrode active material layer without contamination of the boundary or non-uniformity of the boundary such as a wave pattern on the boundary.

According to another aspect of the present disclosure, the dual slot die coater capable of simultaneously discharging two types of electrode active material slurries through the upper slot and the lower slot and forming the electrode active material layer of a double layer on the substrate is provided. It is possible to stably form a boundary between the electrode active material layer of a double layer and the uncoated portion. Accordingly, it is possible to obtain a coating product of uniform quality, particularly an electrode for a secondary battery.

According to another aspect of the present disclosure, when the coating gap relative to the thickness of the coating solution is equal to or greater than a predetermined value, with respect to the offset size A of the upper shim plate and the offset size B of the lower shim plate, even A:B is adjusted, and thus a pattern defect may be completely prevented.

When the slot die coater of the present disclosure is used, it is possible to uniformly form the coating layer, particularly the electrode active material layer, with a desired thickness and shape, and preferably, it is possible to simultaneously coat two types of electrode active material slurries, and thus both performance and productivity are excellent.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The slot die coater or the dual slot die coater of the present disclosure is an apparatus including a slot and coating a coating solution on a substrate through the slot. Since the dual slot die coater includes a lower slot and an upper slot, the dual slot die coater is an apparatus capable of coating a coating solution in a double layer. The 'substrate' described below is a current collector and the coating solution is an 'electrode active material slurry'. Both a first coating solution and a second coating solution are electrode active material slurries, and may mean electrode active material slurries that have the same or different composition (types of an active material, a conductive material, and a binder), content (an amount of each of the active material, the conductive material, and the binder), or physical properties. In particular, the dual slot die coater of the present disclosure is optimized for electrodes manufactured by applying at least two types of electrode active material slurries at the same time or by forming pattern coating while applying at least two types of electrode active material slurries in an alternating manner to form pattern coating. However, the scope of the present disclosure is not necessarily limited thereto. For example, the substrate may be a porous scaffold constituting a separation membrane, and the first coating solution and the second coating solution may be organic matters having different compositions or physical properties. That is, when thin film coating is required, any substrate and any coating solution or any first coating solution and any second coating solution may be good.

Figure 1:
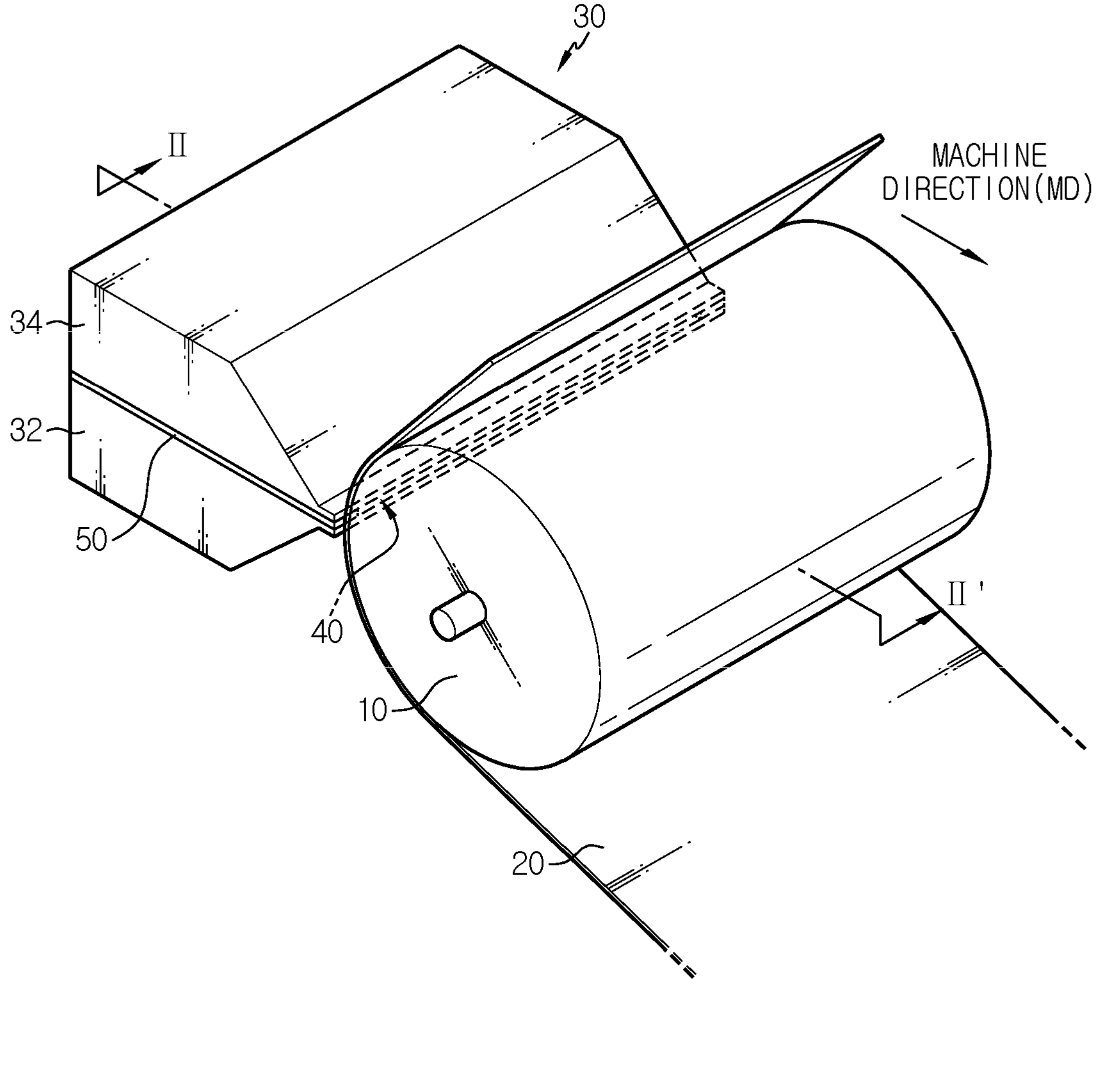
FIG. 1 RELATED ART
FIG. 1 is a schematic diagram showing an example of using a slot die coater according to the conventional art.
Figure 2:
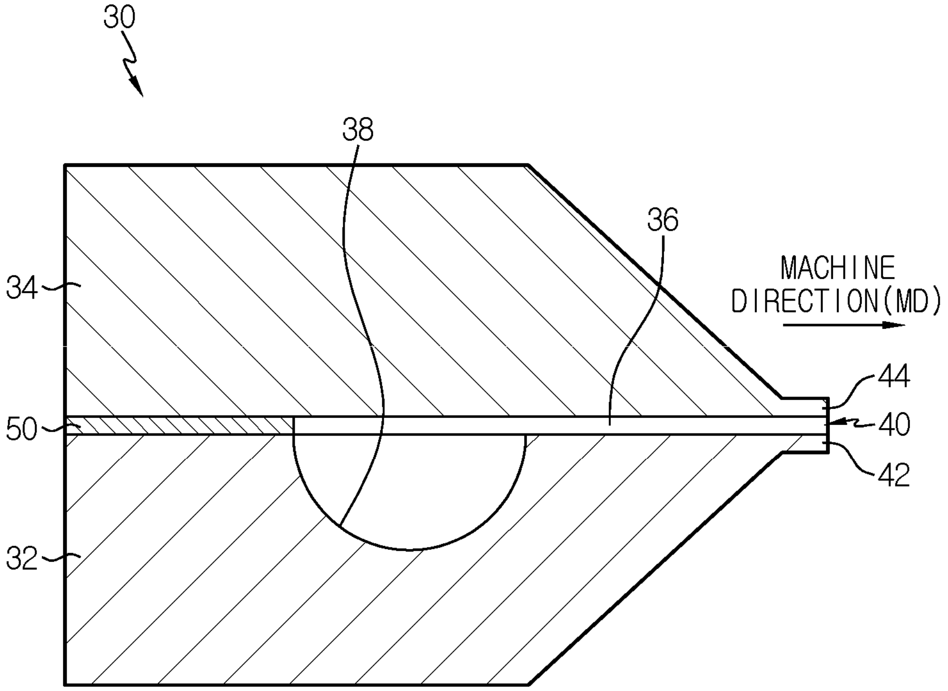
FIG. 2 RELATED ART
FIG. 2 is a cross-sectional view taken along II-II' of FIG. 1.
Figure 3A:
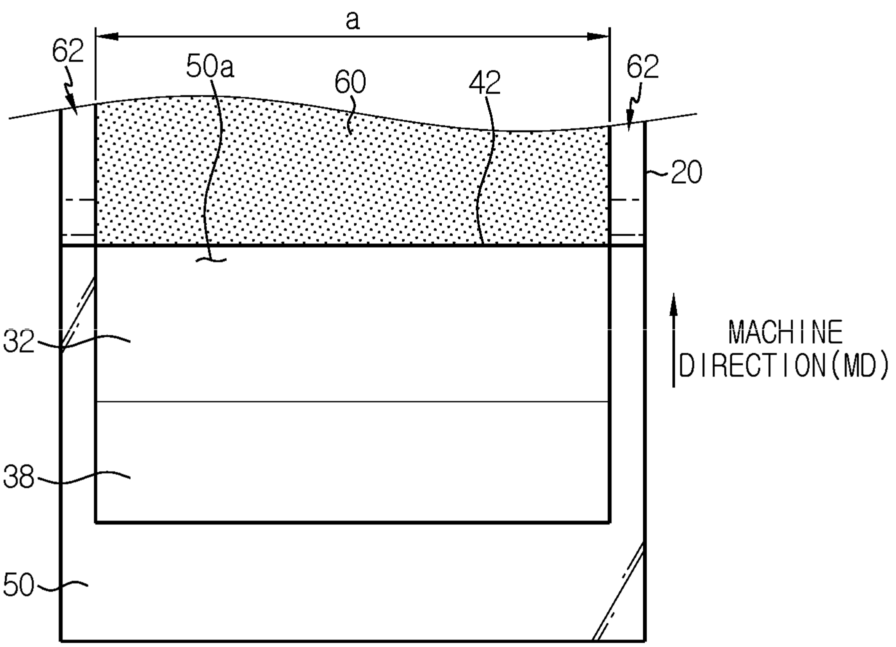
FIG. 3A RELATED ART
FIGS. 3A to 3C show various examples of using a conventional slot die coater.
Figure 3B:
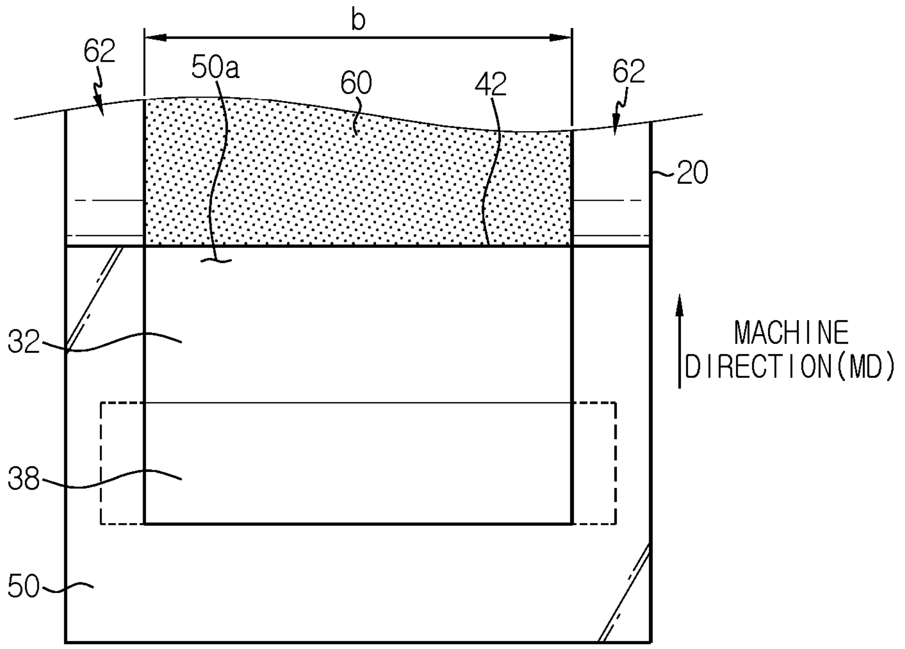
FIG. 3B RELATED ART
Figure 3C:
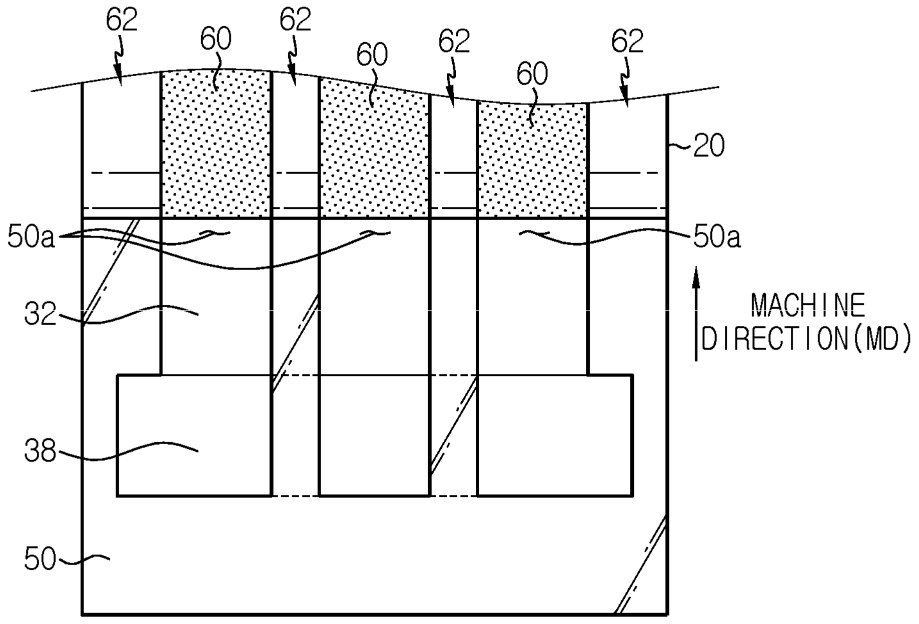
FIG. 3C RELATED ART
Figure 4:
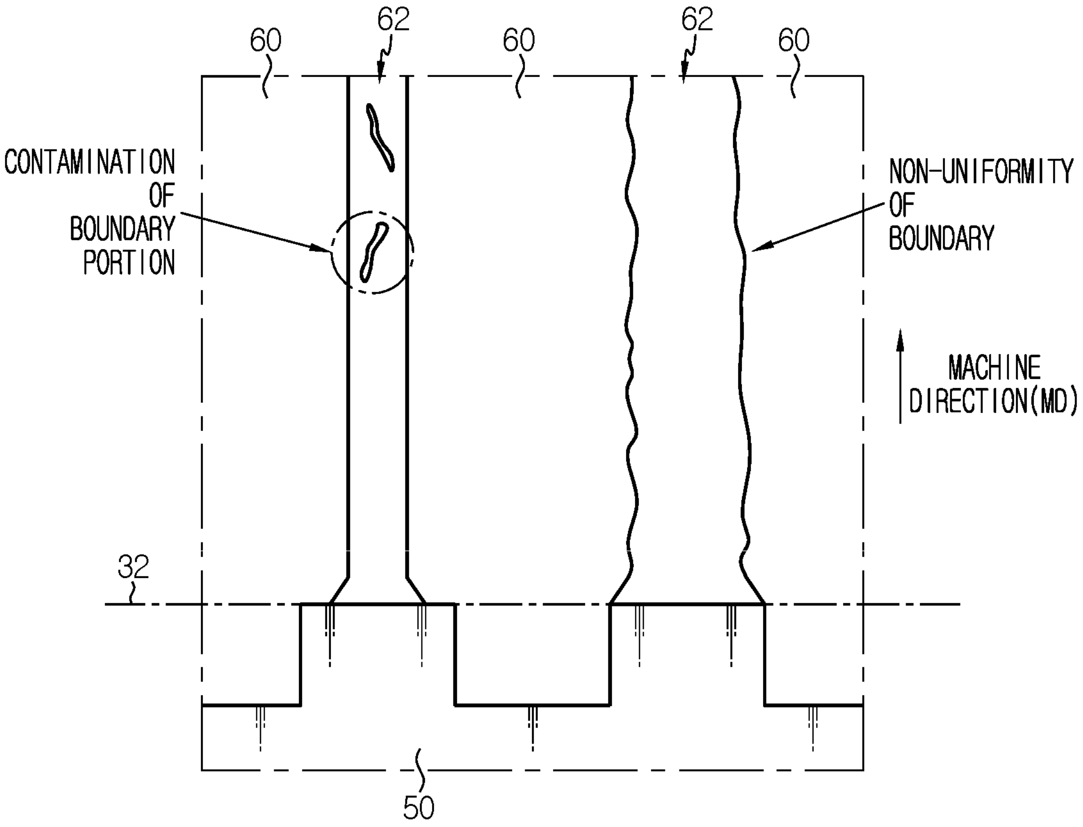
FIG. 4 RELATED ART
FIG. 4 is a diagram showing a problem when a conventional shim plate is used.
Figure 5:
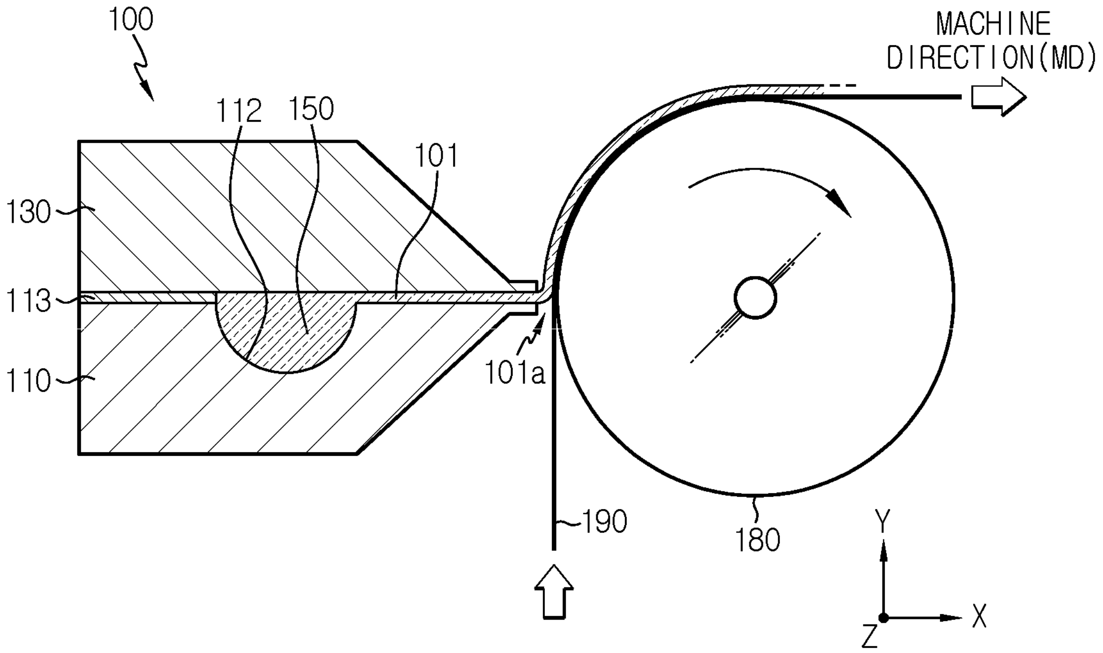
FIG. 5 is a cross-sectional view of a slot die coater according to an embodiment of the present disclosure.
Figure 6:
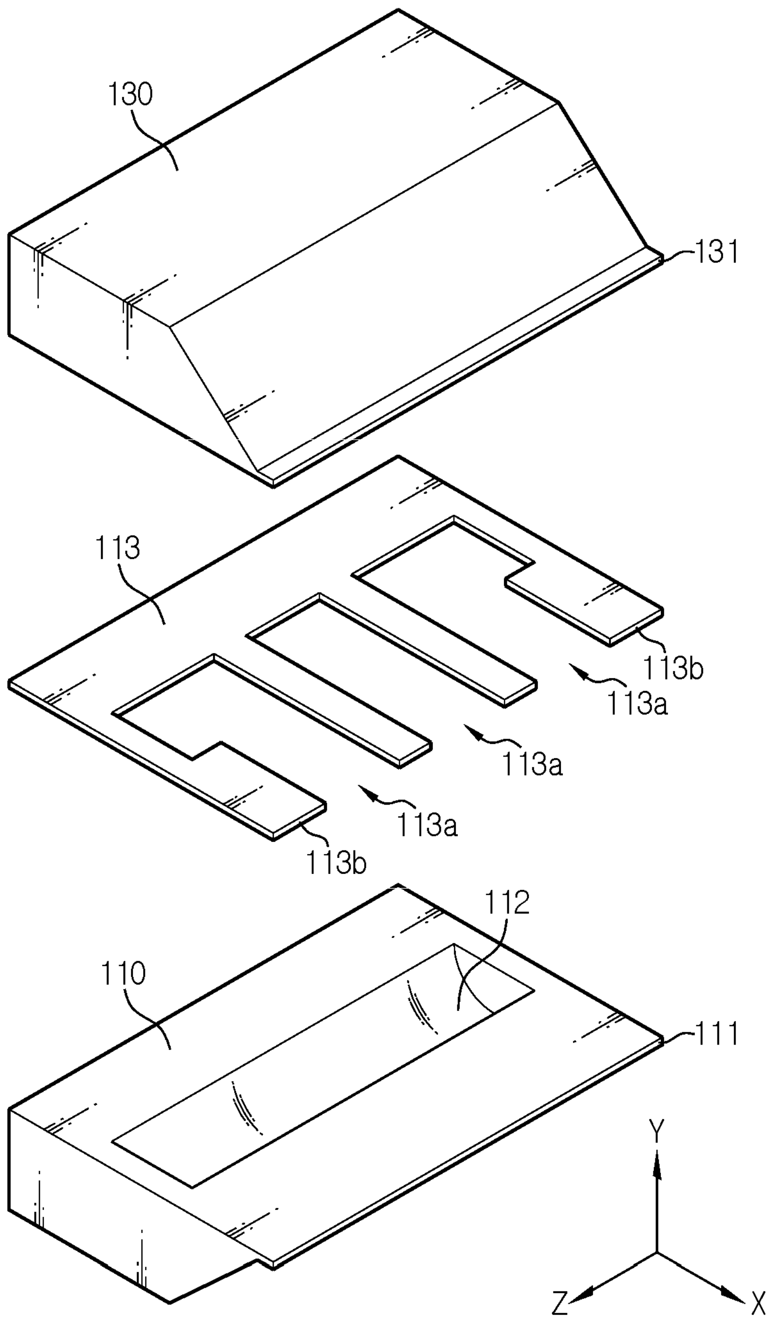
FIG. 6 is a schematic exploded perspective view of a slot die coater according to an embodiment of the present disclosure.
Figure 7:
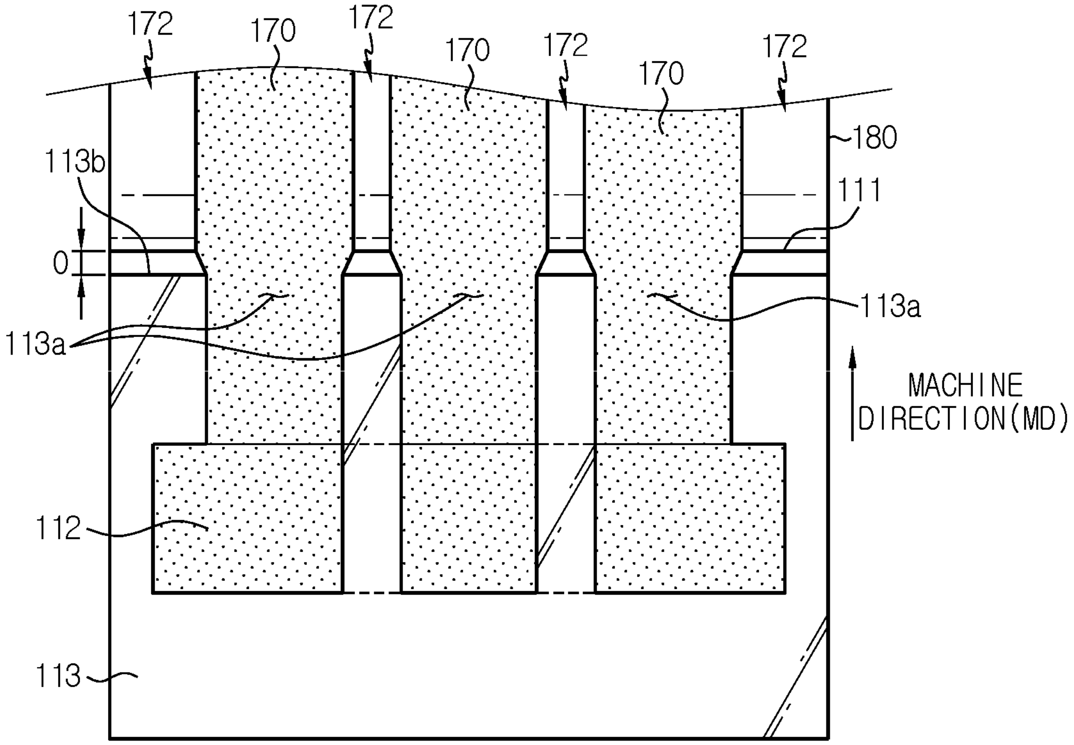
FIG. 7 shows an example of use of a shim plate in a slot die coater according to an embodiment of the present disclosure.

FIG. 5 is a cross-sectional view of a slot die coater according to an embodiment of the present disclosure. FIG. 6 is a schematic exploded perspective view of the slot die coater according to an embodiment of the present disclosure. FIG. 7 shows an example of use of a shim plate in the slot die coater according to an embodiment of the present disclosure.

Referring to FIGS. 5 to 7, the slot die coater 100 includes two die blocks 110 and 130. A shim plate 113 for forming a slot 101 is provided between the die blocks 110 and 130. The die blocks may be two or more.

In FIG. 5, the slot die coater 100 is installed in a substantially horizontal direction (X direction) in which an electrode active material slurry which is a coating solution is discharged (approximately: ±5 degrees). However, the slot die coater 100 is not limited to the example form here. For example, the slot die coater 100 may be configured as a vertical die in which a direction in which the coating solution is discharged upward (Y direction). The Z direction is a width direction of the slot die coater 100.

The slot 101 is formed between where the die blocks 110 and 130 face each other. The shim plate 113 is provided between the die blocks 110 and 130 to provide a gap between the die blocks 110 and 130 so that the slot 101 corresponding to a passage through which the coating solution 150 may flow is formed. A thickness of the shim plate 113 determines a vertical width (Y direction and a slot gap) of the slot 10.

As shown in FIG. 6, the shim plate 113 may include a plurality of open portions 113*a* by intermittently cutting one region thereof and may be interposed in the remaining parts except for one side of an edge region of an opposite surface of each of the die blocks 110 and 130. Accordingly, a discharge port 101*a* through which the coating solution 150 may be discharged to the outside is formed between a die lips 111 and 131, which are fore ends of the die blocks 110 and 130, respectively. The discharge port 101*a* may be formed when the die lips 111 and 131 are spaced apart from each other.

For reference, the shim plate 113 functions as a gasket to prevent the coating solution 150 from leaking into the gap between the die blocks 110 and 130, except for a region where the discharge port 101*a* is formed, and thus the shim plate 113 is preferably made of a material having a sealing property.

Any one of the die blocks 110 and 130 includes a manifold 112 having a predetermined depth and communicatively connected with the slot 101. Although not shown, the manifold 112 is connected to a coating solution supply chamber (not shown) installed outside through a supply pipe to receive the coating solution 150. When the coating solution 150 is fully filled in the manifold 112, the flow of the coating solution 150 is induced along the slot 101 and discharged to the outside through the discharge port 101*a*.

According to the slot die coater 100 having such a configuration, a rotatably provided coating roll 180 is disposed in front of the slot die coater 100, the substrate 190 to be coated by rotating a coating roll 180 is driven, the coating solution 150 may be applied on the substrate 190 by discharging and continuously contacting the coating solution 150 with the surface of the substrate 190. Alternatively, supply and interruption of the coating solution 150 may be alternately performed so that pattern-coating may be intermittently performed on the substrate 190.

Here, the shim plate 113 determines a coating width of a coating layer applied on the substrate 190, and has a state of use as in FIG. 7.

Referring to FIG. 7, the slot die coater 100 of FIG. 5 viewed in a down direction after the die block 130 thereon is removed is illustrated. The end 113*b* of the shim plate 113 is moved backward relative to the die lip 111 so as to be offset relative to the die lip 111. Since the die lips 111 and 131 are usually aligned in a straight line, the end 113*b* of the shim plate 113 is moved backward even relative to the die lip 131 which is not shown here.

In particular, the shim plate 113 shown in FIG. 7 may include a plurality of open portions 113*a* by intermittently cutting one region thereof and form a coating layer 170 of a stripe pattern shape on the substrate 190. Reference numeral 172 denotes an uncoated portion on which a coating layer is not formed. If there is one open portion 113*a*, one coating layer 170 may be formed on the substrate 190.

Preferably, the size of an offset O of the shim plate may be 50 μm to 2000 μm. When the size of the offset O is smaller than 50 μm, the effect of having the offset is insignificant. When the size of the offset O is greater than 2000 μm, since it may cause non-uniformity of the boundary, the size needs not to exceed 2000 μm. The size of the offset O may be determined in consideration of the coating speed, the viscosity of the coating solution, the thickness of the coating solution, the coating gap, etc. When the other conditions are the same and the coating speed is high, the size of the offset O needs to be increased. When the other conditions are the same, and the viscosity of the coating solution increases, the size of the offset O needs to be increased. When the other conditions are the same and the thickness of the coating solution is large, the size of the offset O needs to be increased. When the other conditions are the same, and the coating gap is decreased, the size of the offset O needs to be increased.

As such, in the slot die coater 100 of the present disclosure, the end 113*b* of the shim plate 113 is moved backward relative to the die lips 111 and 131 so as to be offset relative to the die lip 111. According to this configuration, even if a large pressure is applied to the coating solution 150 when the coating gap is small, after the coating solution 150 is sufficiently expanded from the end 113*b* of the shim plate 113 in a section of the offset O, that is, the coating solution 150 may leave the die lips 111 and 131 and reach the substrate 190 so that the coating solution 150 does not scatter to other parts. Accordingly, the boundary may be stably formed between the coating portion and the uncoated portion.

Figure 8:
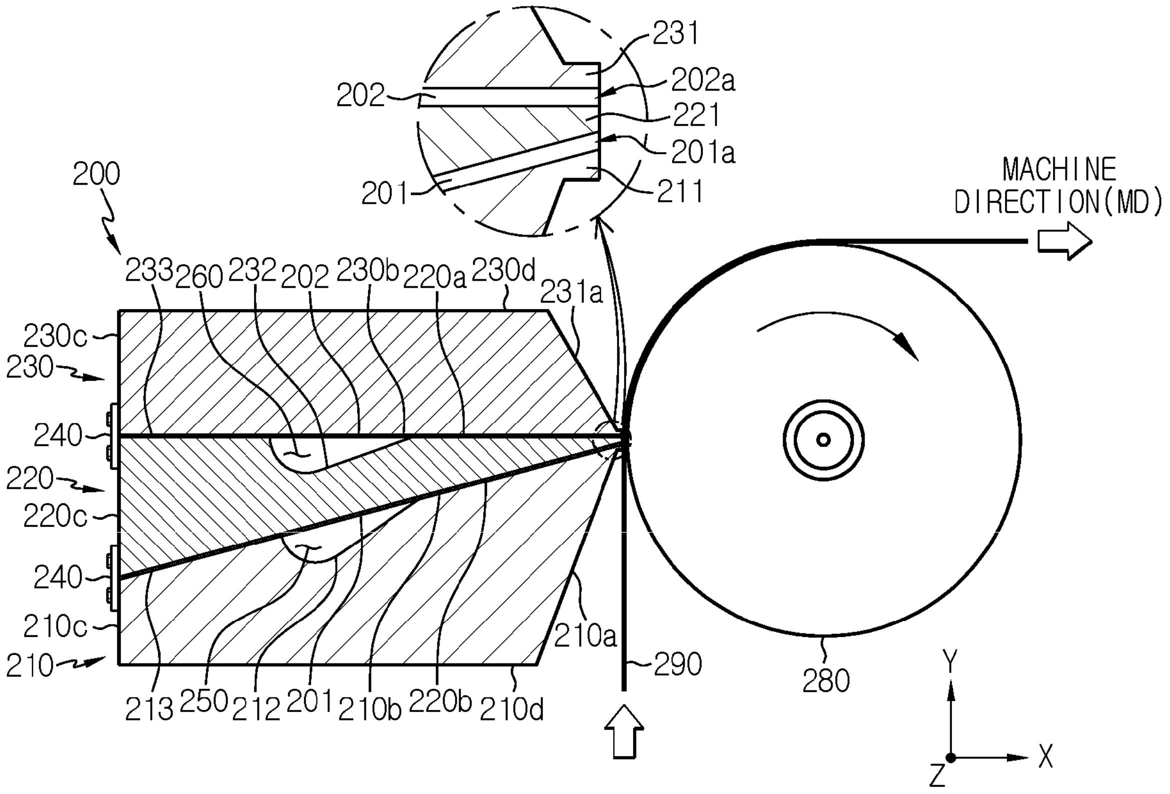
FIG. 8 is a schematic cross-sectional view of a dual slot die coater according to another embodiment of the present disclosure.
Figure 9:
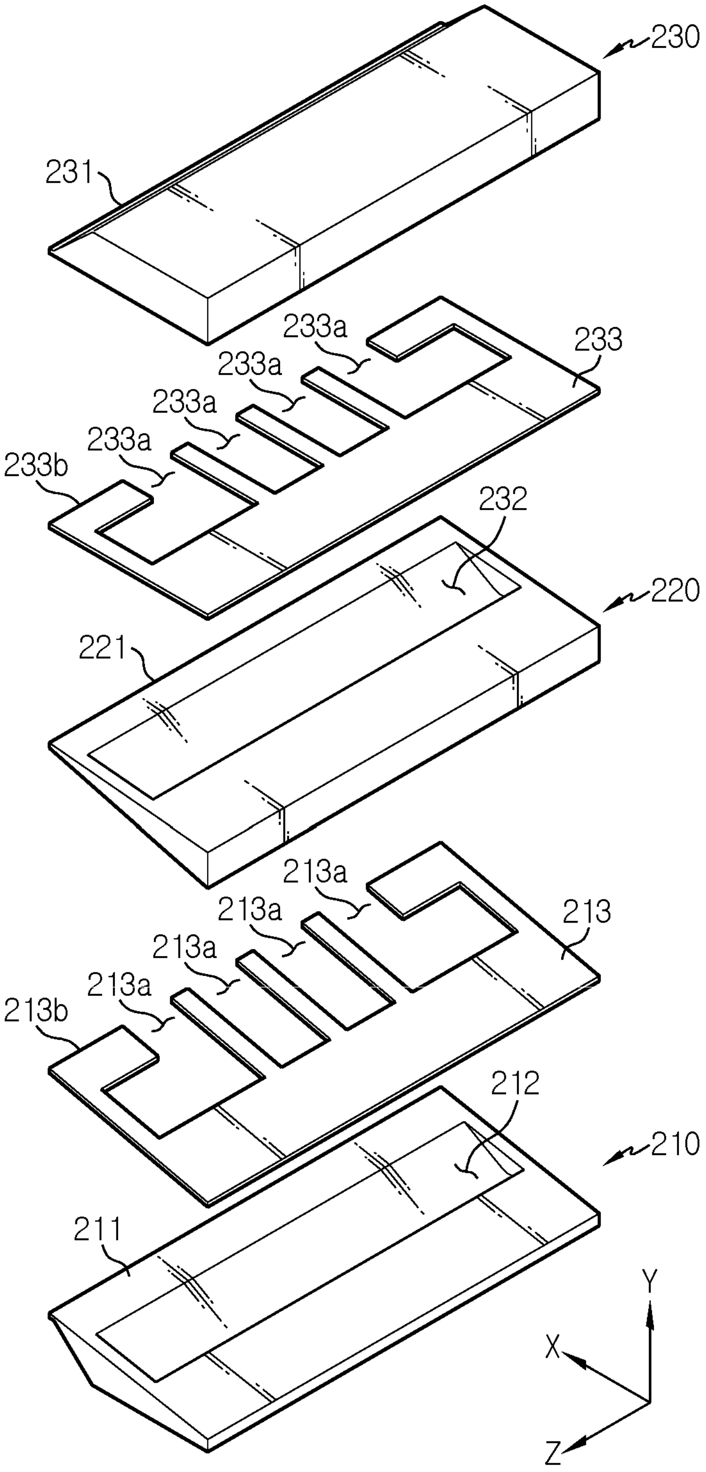
FIG. 9 is a schematic exploded perspective view of a dual slot die coater according to another embodiment of the present disclosure.
Figure 10:
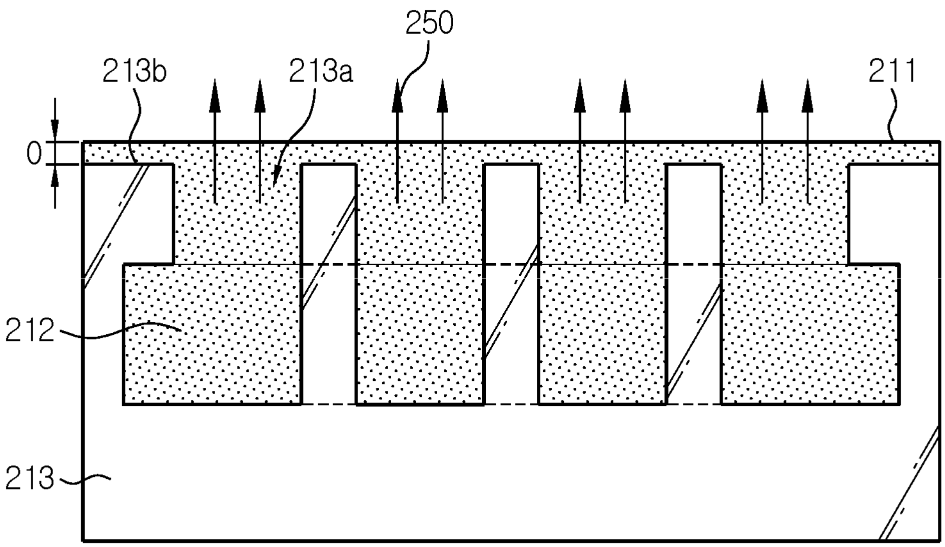
FIG. 10 shows an example of use of a lower shim plate in a dual slot die coater according to another embodiment of the present disclosure.
Figure 11:
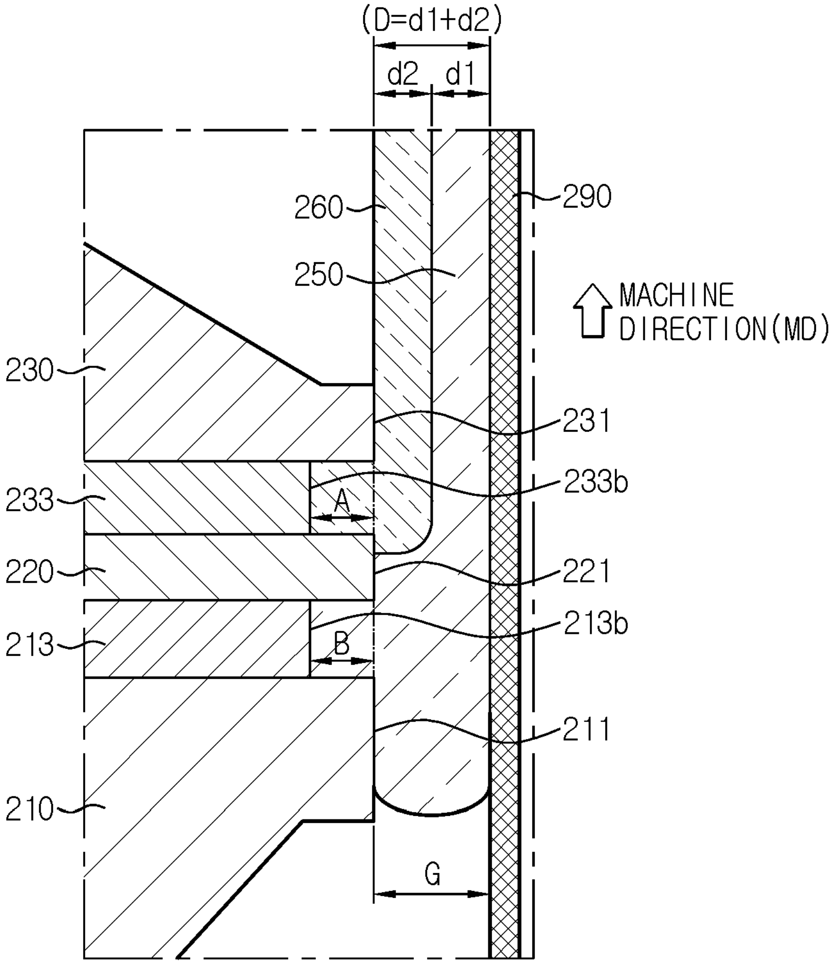
FIG. 11 is a side view of the dual slot die coater shown in FIG. 8.

FIG. 8 is a schematic cross-sectional view of a dual slot die coater according to another embodiment of the present disclosure. FIG. 9 is a schematic exploded perspective view of a dual slot die coater according to another embodiment of the present disclosure. FIG. 10 shows an example of use of a lower shim plate in a dual slot die coater according to another embodiment of the present disclosure. FIG. 11 is a side view of the dual slot die coater shown in FIG. 8.

A dual slot die coater 200 according to the present disclosure is an apparatus including a lower slot 201 and an upper slot 202, and capable of simultaneously or alternately applying the same or different two kinds of coating solutions on a substrate 290 through the lower slot 201 and the upper slot 202.

Referring to FIGS. 8 and 9, the dual slot die coater 200 includes a lower die block 210, an intermediate die block 220 disposed on an upper portion of the lower die block 210, and an upper die block 230 disposed on an upper portion of the intermediate die block 220.

In FIG. 8, the dual slot die coater 200 is installed in a substantially horizontal direction (X direction) in which an electrode active material slurry which is a coating solution is discharged (approximately: ±5 degrees).

The intermediate die block 220 is a block located in the middle of blocks constituting the dual slot die coater 200, and is a block disposed between the lower die block 210 and the upper die block 230 to form a dual slot. A cross section of the intermediate die block 220 of the present embodiment is a right triangle, but is not necessarily limited to such as shape. For example, the cross section may be provided as an isosceles triangle.

A first surface 220*a* of the intermediate die block 220 facing the upper die block 230 lies almost horizontally, and a surface 230*d* (that is, a surface forming an upper surface of an outer circumferential surface of the dual slot die coater 200) opposite to a surface 230*b* of the upper die block 230 facing the first surface 220*a* also lies almost horizontally. In this way, the first surface 220*a* and the opposite surface 230*d* are almost parallel to each other. And a surface 210*d* (that is, a surface forming a lower surface of the outer circumferential surface of the dual slot die coater 200) opposite to a surface 210*b* of the lower die block 210 facing the intermediate die block 220 also lies almost horizontally, and this surface is a bottom surface 210*d* (X-Z plane).

Surfaces of the lower die block 210, the intermediate die block 220, and the upper die block 230 which are opposite to a direction in which the electrode active material slurry is discharged, that is, rear surfaces 210*c*, 220*c*, and 230*c*, lie almost vertically (Y direction).

In a surface forming the outer circumferential surface of the dual slot die coater 200 in the lower die block 210 and the upper die block 230 which are the outermost die blocks, the bottom surface 210*d* of the lower die block 210 and the upper surface 230*d* of the upper die block 230 manufactured to be almost vertical to the rear surfaces 210*c* and 230*c* may be used. And, the first surface 220*a* of the intermediate die block 220 manufactured to be almost vertical to the rear surface 220*c* may be used. In such die blocks 210, 220, and 230, since edges formed by surfaces are formed at right angles, there is a right angle portion in the cross section, and since a vertical or horizontal surface may be used as a reference surface, manufacturing or handling of the die blocks 210, 220, and 230 are easy and the precision thereof is guaranteed. In addition, a state in which the lower die block 210, the intermediate die block 220, and the upper die block 230 are combined has an approximately rectangular parallelepiped shape as a whole, and only a front portion from which the coating solution is discharged is inclined toward the substrate 290. This is advantageous in that a shape after assembly is approximately similar to that of a slot die coater including a single slot (e.g., 100 in FIG. 5) so that a slot die coater stand, etc. may be shared.

The dual slot die coater 200 may further include two or more fixing units 240 provided on the rear surfaces 210*c*, 220*c*, and 230*c* thereof. The fixing units 240 are provided for fastening between the lower die block 210 and the intermediate die block 220 and for fastening between the intermediate die block 220 and the upper die block 230. A plurality of fixing units 240 may be provided in the width direction of the dual slot die coater 200. Bolts are fastened to the fixing units 240, through which the lower die block 210, the intermediate die block 220, and the upper die block 230 are assembled with each other.

The lower die block 210, the intermediate die block 220, and the upper die block 230 are not necessarily limited to shapes of the above examples, and may be configured, for example, as vertical dies with the direction in which the coating solution is discharged as an upper direction and the rear surfaces 210*c*, 220*c*, and 230*c* as bottom surfaces.

The lower die block 210 is a lowermost block among the blocks constituting the dual slot die coater 200, and the surface 210*b* facing the intermediate die block 220 has an inclined shape to form an angle of approximately 20 degrees to 60 degrees with respect to the bottom surface 210*d*.

The lower slot 201 may be formed where the lower die block 210 and the intermediate die block 220 face each other. For example, a lower shim plate 213 is interposed between the lower die block 210 and the intermediate die block 220 to provide a gap therebetween, so that the lower slot 201 corresponding to a passage through which the first coating solution 250 may flow may be formed. That is, the lower shim plate 213 defines the lower slot 201, and in this case, the thickness of the lower shim plate 213 determines the vertical width (Y-axis direction and a slot gap) of the lower slot 201.

The lower shim plate 213 includes a plurality of open portions 213 a by intermittently cutting one region thereof so that a coating width of the electrode active material layer formed on the substrate 290 is determined and may be interposed in the remaining portion except for one side in an edge region of an opposite surface of each of the lower die block 210 and the intermediate die block 220 as shown in FIGS. 9 and 10. Accordingly, a lower discharge port 201*a* through which the first coating solution 250 may be discharged to the outside is formed only between a lower die lip 211 which is a front end portion of the lower die block 210 and the intermediate die lip 221 which is a front end portion of the intermediate die block 220. The lower discharge port 201*a* may be formed by making the lower die lip 211 and the intermediate die lip 221 spaced apart from each other.

For reference, the lower shim plate 213 functions as a gasket to prevent the first coating solution 250 from leaking into a gap between the lower die block 210 and the intermediate die block 220 except for the region where the lower discharge port 201*a* is formed, and thus the lower shim plate 213 is preferably made of a material having sealing property.

The lower die block 210 includes a first manifold 212 having a predetermined depth on the surface 210*b* facing the intermediate die block 220 and communicatively connected to the lower slot 201. Although not shown in the drawings, the first manifold 212 is connected to a supply chamber (not shown) of the first coating solution 250 installed outside through a supply pipe to receive the first coating solution 250. When the first coating solution 250 is fully filled in the first manifold 212, the flow of the first coating solution 250 is induced along the lower slot 201 and discharged to the outside through the lower discharge port 201*a*.

As another example, the first manifold 212 may be provided on a surface 220*b* of the intermediate die block 220 facing the lower die block 210.

The upper die block 230 is disposed to face the first surface 220*a* which is an upper surface of the intermediate die block 220 that is horizontal with respect to a bottom surface. The upper slot 202 is thus formed where the intermediate die block 220 and the upper die block 230 face to each other.

Like the lower slot 201 described above, a second shim plate 233 may be interposed between the intermediate die block 220 and the upper die block 230 to provide a gap therebetween. Accordingly, the upper slot 202 corresponding to a passage through which a second coating solution 260 may flow is formed. In this case, a vertical width (Y-axis direction and a slot gap) of the upper slot 202 is determined by the second shim plate 233.

In addition, the second shim plate 233, which also has a structure similar to that of the above-described first shim plate 213, includes a plurality of open portions 233*a* by intermittently cutting one region thereof, and may be interposed in the remaining portion except for one side in an edge region of an opposite surface of each of the intermediate die block 220 and the upper die block 230. Similarly, a circumferential direction of the second shim plate 233 except for the front of the upper slot 202 is blocked, and the upper discharge port 202*a* is formed only between the front end portion of the intermediate die block 220 and a front end portion of the upper die block 230. The front end portion of the upper die block 230 is defined as the upper die lip 231. In other words, the upper discharge port 202*a* may be formed by making the intermediate die lip 221 and the upper die lip 231 spaced apart from each other. As such, the upper shim plate 233 defines the upper slot 202.

In addition, the intermediate die block 220 includes a second manifold 232 having a predetermined depth on the surface 220*a* facing the upper die block 230 and communicatively connected to the upper slot 202. Although not shown in the drawings, the second manifold 232 is connected to a supply chamber of the second coating solution 260 installed outside through a supply pipe to receive the second coating solution 260. When the second coating solution 260 is supplied from the outside along the supply pipe in the shape of a pipe and fully filled in the second manifold 232, the flow of the second coating solution 260 is induced along the upper slot 202 communicatively connected to the second manifold 232 and discharged to the outside through the upper discharge port 202*a*.

As another example, the second manifold 232 may be provided on the surface 230*b* of the upper die block 230 facing the middle die block 220.

The upper slot 202 and the lower slot 201 form a certain angle, and the angle may be approximately 20 degrees to 70 degrees. The upper slot 202 and the lower slot 201 may intersect each other at one point, and the upper discharge port 202*a* and the lower discharge port 201*a* may be provided near the intersection point. Accordingly, discharge points of the first coating solution 250 and the second coating solution 260 may be concentrated approximately at one point.

In the dual slot die coater 200, a rotatably provided coating roll 280 is disposed in front of the dual slot die coater 200, the substrate 290 to be coated by rotating the coating roll 280 is driven, a coating solution such as the electrode active material slurry is extruded through at least one of the upper slot 202 and the lower slot 201 to form the electrode active material layer on the substrate 290.

Here, the lower shim plate 213 and the upper shim plate 233 determine the coating width of the electrode active material layer applied on the substrate 290, and have the same state of use as in FIG. 10.

Referring to FIG. 10, the slot die coater 200 of FIG. 8 viewed in a down direction after the upper die block 230 and the intermediate die block 220 thereon are removed is illustrated. The end **213*b* of the lower shim plate 213 is moved backward relative to the lower die lip 211 so as to be offset relative to the lower die lip 211. The first coating solution 250 may be discharged from the first manifold 212 toward the substrate 290 through the open portion 213*a* of the lower shim plate 213. Since the lower die lip 211 and the intermediate die lip 221 are usually aligned in a straight line, the end 213*b* of the lower shim plate 213 is also moved backward relative to the intermediate die lip 221** which is not shown here.

The size of the offset O may be 50 μm to 2000 μm.

The example of use of the upper shim plate 233 is the same as that of the lower shim plate 213, and the end **233*b* of the upper shim plate 233 is also offset relative to the upper die lip 221 and the intermediate die lip 221. The size of the offset O of the upper shim plate 233** may also be 50 μm to 2000 μm.

The lower shim plate 213 and the upper shim plate 233 are aligned with each other in the up and down direction (X direction) and left and right direction (Z direction), and thus may be used as shown in FIG. 11. According to the dual slot die coater 200 having the configuration described above with further reference to FIG. 11, the rotatably provided coating roll 280 is disposed in front of the dual slot die coater 200, the substrate 290 to be coated by rotating the coating roll 280 is driven, and the first coating solution 250 and the second coating solution 260 are continuously contacted with the surface of the substrate 290 so that the substrate 290 may be coated in a double layer. Alternatively, supply and interruption of the first coating solution 250 and supply and interruption of the second coating solution 260 are alternately performed so that pattern-coating may be intermittently performed on the substrate 290.

Here, the offset size A of the upper shim plate 233 and the offset size B of the lower shim plate 213 may be the same or different. For example, A>B, A<B, or A=B.

When the first coating solution 250 and the second coating solution 260 are continuously contacted with the surface of the substrate 290 so that the substrate 290 is coated in the double layer as shown, in the relationship between the total coating solution thickness D which is the sum of the first coating solution thickness d1 and the second coating solution thickness d2 formed on the substrate 290 and the coating gap G, which is a distance between the discharge ports **201*a* and 202*a* of the slot die coater 200 and the substrate 290 or a distance between the die lips 211, 221, and 231 and the substrate 290**, the coating gap G is preferably adjusted between a value 20% greater than and a value 20% smaller than the coating solution thickness D. In other words, the coating gap G relative to the coating solution thickness D is preferably set to have a value between 0.8 and 1.2. When the coating gap G is much greater than the coating solution thickness D, fat-edge occurs in which the edge of the coating layer is thickly formed. When the coating gap G is much smaller than the coating solution thickness D, since a large pressure is applied, a pattern defect occurs due to scattering of the coating solution, etc. The standard of 20% is determined in consideration of this point.

In particular, when the coating gap G is equal to or greater than a predetermined value compared to the coating solution thickness D, the coating width is beyond a range adjustable by the coating gap G. The present inventors have found that with respect to the offset size A of the upper shim plate 233 and the offset size B of the lower shim plate 213, A:B is preferably in the range of 7:1 to 1:7 when the coating gap G relative to the coating solution thickness D is equal to or greater than 1.06. When the coating gap G relative to the coating solution thickness D is equal to or greater than 1.06, if A:B is beyond the above range, a pattern defect occurs.

In the present disclosure, the pattern defect is prevented by basically setting each of the offset size A of the upper shim plate 233 and the offset size B of the lower shim plate 213 within the range of 50 μm to 2000 μm. Furthermore, it is proposed that the ratio of the offset size A of the upper shim plate 233 to the offset size B of the lower shim plate 213 also needs to be considered when the coating gap G relative to the coating solution thickness D is greater than 1.06.

When the coating gap G relative to the coating solution thickness D is smaller than a predetermined value, it is sufficient to set each of the offset size A of the upper shim plate 233 and the offset size B of the lower shim plate 213 within the range of 50 μm to 2000 μm as a solution to relieve the pressure applied to the coating solution, but it should be noted that when the coating gap G relative to the coating solution thickness D is equal to or greater than a predetermined value, with respect to the offset size A of the upper shim plate 233 and the offset size B of the lower shim plate 213, even A:B is adjusted, and thus a pattern defect may be completely prevented.

The dual slot die coater 200 is optimized for application of the electrode active material slurry for manufacturing a secondary battery. In order to manufacture a secondary battery of high energy density, the thickness of the electrode active material layer which was about 130 μm gradually increased to reach 300 μm. When the thick electrode active material layer is formed with the conventional slot die coater, since migration of a binder and a conductive material in the active material slurry deepens during drying, a final electrode is manufactured non-uniformly. In order to solve this problem, when coating is performed two times such as applying thinly and drying the electrode active material layer and then applying and drying the electrode active material layer, a disadvantage is that it takes a long time. In order to simultaneously improve electrode performance and productivity, when the dual slot die coater 200 is used, two types of electrode active material slurries may be simultaneously applied.

And, according to the offset configuration of the lower shim plate 213 and the upper shim plate 233 as proposed in the present disclosure, even if a large pressure is applied to the electrode active material slurry when the coating gap is small, the coating solution does not scatter. Accordingly, the boundary may be stably formed between the coating portion and the uncoated portion. In particular, when the electrode active material layer having a stripe pattern shape is formed, it is possible to stably form the electrode active material layer without contamination of the boundary or non-uniformity of the boundary such as a wave pattern on the boundary. This leads to no defect in the slitting along the uncoated portion. It is possible to reduce a discarded electrode plate, and thus the cost reduction effect is excellent. In addition, in the case where the coating gap is relatively large, under the condition that it is difficult to adjust the coating width, with respect to the offset size A of the upper shim plate 233 and the offset size B of the lower shim plate 213, even A:B is adjusted, and thus a double layer is stably formed without scattering the electrode active material slurry.

According to the present disclosure, when the electrode active material layer of a double layer is formed on the substrate 290 by simultaneously discharging two types of electrode active material slurries through the upper slot 202 and the lower slot 201, it is possible to stably form a boundary between the electrode active material layer of a double layer and the uncoated portion in both cases where different types of electrode active material slurries are used or the electrode active material layer is thickly coated by using the same electrode active material slurry. Accordingly, it is possible to obtain a coating product of uniform quality, particularly an electrode for a secondary battery.

When the dual slot die coater 200 of the present disclosure is used, it is possible to uniformly form the coating layer, particularly the electrode active material layer, with a desired thickness and shape, and preferably, it is possible to simultaneously coat two types of electrode active material slurries, and thus both performance and productivity are excellent.

Meanwhile, in the present embodiment, the case of applying the coating solution in two layers or the case of performing pattern-coating by alternately supplying the coating solution has been described as an example, but it will be understood without separate explanation that it is also applied to the case where three or more layers are simultaneously applied by providing three or more slots.

As described above, according to the present disclosure, even if the discharge pressure of the electrode active material slurry increases, the effect of preventing the electrode active material slurry from scattering by relieving the pressure of the electrode active material slurry by the shim plate offset structure is excellent. This has the effect of forming a stable boundary, securing coating processability, and securing reproducibility.

Hereinafter, comparative examples and embodiments will be described in order to explain the effect of the shim plate offset as proposed in the present disclosure. First, with respect to Comparative Examples 1 to 5 and Embodiments 1 to 5 in the slot die coater including one slot as described with reference to FIG. 5, etc., the experimental conditions and results are summarized in Table 1.

Comparative Examples 1 to 4 are cases where the offset is 0 when the end of the shim plate is aligned with the die lip. Embodiments 1 to 5 are cases where the end of the shim plate is moved backward from the die lip so that the shim plate has the offset of 50 μm to 2000 μm. Comparative Example 5 is case where the offset is 2500 μm which exceeds the preferred offset range proposed in the present disclosure.

The coating speed was all set to 50 m/min. The viscosity of the electrode active material slurry which is the coating solution was all 4000 cps. The thickness of the coating solution was 100 μm as a target. Cases where the coating gap is 90 μm, 105 μm, 115 μm, and 125 μm were experimented.

As a result of the experiment, in all the embodiments of the present disclosure in which the shim plate offset is present, contamination of the boundary portion has not occurred. When the coating gap is 115 μm and 125 μm as in Comparative Examples 2 and 3 in which the shim plate offset is 0, contamination of the boundary portion has not occurred, but other defects such as fat-edge has occurred. In Comparative Example 1 in which the coating gap is reduced to 105 μm, not only other defects but also contamination of the boundary portion has occurred. In particular, in Comparative Example 4, in which more pressure is applied to the electrode active material slurry because the coating gap is 90 μm which is smaller than 100 μm which is the coating solution thickness, the contamination of the boundary portion was severe. Therefore, when there is no shim plate offset as in Comparative Examples 1 to 3, other defects occur, and when the coating gap is reduced as in Comparative Examples 1 and 4, contamination of the boundary portion occurs.

The non-uniformity of the boundary has occurred in Comparative Example 5 in which the shim plate offset is 2500 μm. Therefore, the offset should not be too large.

As described above, according to an embodiment of the present disclosure, the shim plate offset is 50 μm to 2000 μm, thereby forming the electrode active material layer having no contamination of the boundary portion, a uniform boundary and no other defects. In particular, as in Embodiments 1 and 2, since the coating gap is 90 μm which is smaller than 100 μm which is the coating solution thickness, it should be paid to the remarkable effect of forming a stable boundary even when more pressure is applied to the electrode active material slurry.

Next, Comparative Examples 6 to 13 and Embodiments 6 to 15 in the dual slot die coater including two slots as described with reference to FIG. 8, etc. will be described.

TABLE 1

| | Coating speed (m/min) | Viscosity (cps) | Coating solution thickness (μm) | Coating gap (μm) | Shim plate offset (μm) | Contamination of boundary portion | Non-uniformity of boundary | Other defects |
|---|---|---|---|---|---|---|---|---|
| Comparative example 1 | 50 | 4000 | 100 | 105 | 0 | ○ | X | Fat-Edge |
| Comparative example 2 | 50 | 4000 | 100 | 115 | 0 | X | X | Fat-Edge |
| Comparative example 3 | 50 | 4000 | 100 | 125 | 0 | X | X | Fat-Edge |
| Comparative example 4 | 50 | 4000 | 100 | 90 | 0 | ○ | X | X |
| Embodiment 1 | 50 | 4000 | 100 | 90 | 50 | X | X | X |
| Embodiment 2 | 50 | 4000 | 100 | 90 | 200 | X | X | X |
| Embodiment 3 | 50 | 4000 | 100 | 105 | 500 | X | X | X |
| Embodiment 4 | 50 | 4000 | 100 | 105 | 1000 | X | X | X |
| Embodiment 5 | 50 | 4000 | 100 | 105 | 2000 | X | X | X |
| Comparative example 5 | 50 | 4000 | 100 | 105 | 2500 | X | ○ | ○ |

The experimental conditions and results are summarized in Table 2.

TABLE 2

| | Coating solution thickness (μm) | | Coating gap (μm) | Coating gap relative to coating solution thickness | Shim plate offset (μm) | | A:B | Contamination of boundary portion | Non-uniformity of boundary | Other defects |
|---|---|---|---|---|---|---|---|---|---|---|
| | upper layer | lower layer | | | upper layer (A) | lower layer (B) | | | | |
| Comparative example 6 | 80 | 80 | 170 | 1.06 | 0 | 0 | | ○ | X | Fat-Edge |
| Comparative example 7 | 80 | 80 | 180 | 1.13 | 0 | 0 | | X | X | Fat-Edge |
| Comparative example 8 | 80 | 80 | 190 | 1.19 | 0 | 0 | | X | X | Fat-Edge |
| Embodiment 6 | 80 | 80 | 170 | 1.06 | 50 | 50 | 1:1 | X | X | X |
| Embodiment 7 | 80 | 80 | 170 | 1.06 | 500 | 500 | 1:1 | X | X | X |
| Embodiment 8 | 80 | 80 | 170 | 1.06 | 1000 | 1000 | 1:1 | X | X | X |
| Embodiment 9 | 80 | 80 | 170 | 1.06 | 2000 | 2000 | 1:1 | X | X | X |
| Comparative example 9 | 80 | 80 | 170 | 1.06 | 2500 | 2500 | 1:1 | X | ○ | ○ |
| Embodiment 10 | 80 | 80 | 170 | 1.06 | 300 | 100 | 3:1 | X | X | X |
| Embodiment 11 | 80 | 80 | 170 | 1.06 | 650 | 100 | 6.5:1 | X | X | X |
| Comparative example 10 | 80 | 80 | 170 | 1.06 | 800 | 100 | 8:1 | X | ○ | X |
| Embodiment 12 | 80 | 80 | 170 | 1.06 | 100 | 650 | 1:6.5 | X | X | X |
| Comparative example 11 | 80 | 80 | 170 | 1.06 | 100 | 800 | 1:8 | X | ○ | X |
| Comparative example 12 | 80 | 80 | 150 | 0.94 | 0 | 0 | | ○ | X | X |
| Embodiment 13 | 80 | 80 | 150 | 0.94 | 50 | 50 | 1:1 | X | X | X |
| Embodiment 14 | 80 | 80 | 150 | 0.94 | 200 | 200 | 1:1 | X | X | X |
| Embodiment 15 | 80 | 80 | 150 | 0.94 | 2000 | 2000 | 1:1 | X | X | X |
| Comparative example 13 | 80 | 80 | 150 | 0.94 | 2500 | 2500 | 1:1 | X | ○ | ○ |

The total thickness of the coating solution which is the sum of the coating solution thickness of the upper layer by the second coating solution 260 and the coating solution thickness of the lower layer by the first coating solution 250, is 160 μm as a target. Cases where the coating gap is 150 μm, 170 μm, 180 μm, and 190 μm were experimented.

Comparative Examples 6 to 8 and 12 are cases where the offset is all 0 when the ends of the upper shim plate and the lower shim plate are aligned with the die lip. Comparative Examples 9 and 13 are cases where the offset is 2500 μm which exceeds the preferred offset range proposed by the present disclosure. Embodiments 6 to 15 are cases where the ends of the upper shim plate and the lower shim plate are moved backward from the die lip so that the upper shim plate and the lower shim plate have the offset of 50 μm to 2000 μm.

As a result of the experiment, in all the embodiments of the present disclosure in which the shim plate offset is present, contamination of the boundary portion has not occurred. There was no non-uniformity of the boundary. In Comparative Examples 6 to 8 and 12 in which the shim plate offset is 0, contamination of the boundary portion or fat-edge has occurred. In Comparative Examples 9 and 13 in which the shim plate offset is 2500 μm, non-uniformity of the boundary and other defects have occurred.

In particular, it is noticeable that Comparative Examples 10 and 11 are cases where the offset size A of the upper shim plate and the offset size B of the lower shim plate are within the range proposed in the present disclosure, but the coating gap to the coating solution thickness is 1.06 and A:B is beyond the range proposed in the present disclosure. At this time, the non-uniformity of the boundary has been observed.

As described above, according to an embodiment of the present disclosure, the offset size A of the upper shim plate and the offset size B of the lower shim plate are adjusted within 50 μm to 2000 μm, thereby forming the electrode active material layer having no contamination of the boundary portion, a uniform boundary and no other defects. In particular, as in Embodiments 6 to 12, when the coating gap is greater than the coating solution thickness, and the coating gap to the coating solution thickness is equal to or greater than 1.06, A:B is set to 7:1 to 1:7, thereby forming the electrode active material layer having no contamination of the boundary portion, a uniform boundary and no other defects.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, although terms indicating directions such as up, down, left, and right are used in the present specification, these terms are only for convenience of description, and it is apparent to those skilled in the art that these terms may vary depending on a position of a target object or a position of an observer.

[Explanation of Reference Numerals]

| | |
|---|---|
| 100: slot die coater | 101: slot |
| 101a: discharge port | 110, 130: die block |
| 111, 131: die lip | 112: manifold |
| 113: shim plate | 113a: open portion |
| 113b: end | O: offset |
| 150: coating solution | 170: coating layer |
| 172: uncoated portion | 180, 280: coating roll |
| 190, 290: substrate | 200: dual slot die coater |
| 201: lower slot | 201a: lower discharge port |
| 202: upper slot | 202a: upper discharge port |
| 210: lower die block | 211: lower die lip |
| 212: first manifold | 213: lower shim plate |
| 220: intermediate die block | 221: intermediate die lip |
| 230: upper die block | 231: upper die lip |
| 232: second manifold | 233: upper shim plate |
| 240: fixing unit | 250: first coating solution |
| 260: second coating solution | |

What is claimed is:

1. A dual slot die coater comprising:

a lower die block;

an intermediate die block disposed on an upper portion of the lower die block to form a lower slot therebetween;

an upper die block disposed on an upper portion of the intermediate die block to form an upper slot therebetween;

a lower shim plate configured to define the lower slot; and an upper shim plate configured to define the upper slot, wherein the lower die block, the intermediate die block, and the upper die block respectively comprise a lower die lip, an intermediate die lip, and an upper die lip forming front ends thereof, a lower discharge port communicatively connected with the lower slot is formed between the lower die lip and the intermediate die lip, and an upper discharge port communicatively connected with the upper slot is formed between the intermediate die lip and the upper die lip, wherein the front ends of the lower, intermediate, and upper die lips are defined along a common plane, wherein the dual slot die coater is configured to discharge and apply an electrode active material slurry to a surface of a continuously traveling substrate through at least one of the lower slot and the upper slot and form an electrode active material layer, wherein ends of the lower shim plate and the upper shim plate are spaced backward relative to the common plane of the lower die lip, the intermediate die lip, and the upper die lip so as to be offset relative to the common plane, wherein each of the lower shim plate and the upper shim plate comprises a plurality of open portions intermittently defined in one region thereof and corresponding to each other such that a coating width of the electrode active material layer formed on the substrate is determined, and the electrode active material layer of a stripe pattern shape is formed on the substrate, and wherein the stripe pattern shape includes a plurality of coated portions based on the plurality of open portions, respectively, such that uncoated portions are defined on both sides of each of the plurality of coated portions.

2. The dual slot die coater of claim 1, wherein a size of the offset is 50 μm to 2000 μm.

3. The dual slot die coater of claim 1, wherein each of the lower shim plate and the upper shim plate comprises an open portion formed by cutting one region thereof such that a coating width of the electrode active material layer formed on the substrate is determined.

4. The dual slot die coater of claim 1, wherein the lower shim plate and the upper shim plate are aligned with each other in an up and down direction.

5. The dual slot die coater of claim 1, wherein the lower die block comprises a first manifold accommodating a first electrode active material slurry and communicatively connected with the lower slot and the intermediate die block comprises a second manifold accommodating a second electrode active material slurry and communicatively connected with the upper slot.

6. The dual slot die coater of claim 1, wherein an offset size A of the upper shim plate and an offset size B of the lower shim plate are the same.

7. The dual slot die coater of claim 1, wherein an offset size A of the upper shim plate is different from an offset size B of the lower shim plate.

8. The dual slot die coater of claim 1, wherein the dual slot die coater is configured to simultaneously discharge two types of electrode active material slurries through the upper slot and the lower slot to form an electrode active material layer of a double layer on the substrate, and wherein when a coating gap to a coating solution thickness of the electrode active material slurries formed on the substrate is equal to or greater than 1.06, with respect to an offset size A of the upper shim plate and an offset size B of the lower shim plate, A: B is set to 7:1 to 1:7.

9. The dual slot die coater of claim 1, wherein the dual slot die coater further comprises a plurality of fixing units directly contacting rear surfaces of the lower die block, the intermediate die block, and the upper die block.

* * * * *